(12) United States Patent
Arunachalam et al.

(10) Patent No.: US 12,726,866 B2
(45) Date of Patent: Sep. 1, 2026

(54) CONFIGURING DIFFERENT MOBILITY REPORTING TRIGGER CONDITIONS FOR RELIABLE NETWORK CONNECTIVITY

(71) Applicant: Telefonaktiebolaget LM Ericsson (publ), Stockholm (SE)

(72) Inventors: Jagadeesh Arunachalam, Malmö (SE); Jens Jansson, Eslöv (SE); Per Fryking, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 943 days.

(21) Appl. No.: 17/912,901

(22) PCT Filed: Mar. 23, 2020

(86) PCT No.: PCT/EP2020/058009
§ 371 (c)(1),
(2) Date: Sep. 20, 2022

(87) PCT Pub. No.: WO2021/190725
PCT Pub. Date: Sep. 30, 2021

(65) Prior Publication Data
US 2023/0018870 A1 Jan. 19, 2023

(51) Int. Cl.
*H04W 36/00* (2009.01)
*H04W 8/08* (2009.01)
*H04W 84/00* (2009.01)

(52) U.S. Cl.
CPC ......... *H04W 36/0088* (2013.01); *H04W 8/08* (2013.01); *H04W 84/005* (2013.01)

(58) Field of Classification Search
CPC . H04W 36/0088; H04W 8/08; H04W 84/005; H04W 88/06; H04W 36/0085;
(Continued)

(56) References Cited

U.S. PATENT DOCUMENTS 7,693,486 B2 * 4/2010 Kasslin ............ H04W 72/1215 370/332
8,107,968 B2 * 1/2012 Kasslin ................ H04W 88/06 455/454
(Continued)

FOREIGN PATENT DOCUMENTS

EP 1467526 A1 10/2004
WO 2014023362 A1 2/2014
(Continued)

OTHER PUBLICATIONS

"Mobility states and speed based parameter scaling in NR", 3GPP TSG-RAN WG2 #100, Tdoc R2-1713593, Ericsson, Reno, Nevada, Nov. 27-Dec. 1, 2017, 5 pages.
(Continued)

*Primary Examiner* — Brian T O'Connor
(74) *Attorney, Agent, or Firm* — Murphy, Bilak & Homiller, PLLC

(57) ABSTRACT

There is provided mechanisms for staggering connection establishment occasions for associated wireless modems. A method is performed by a controller. The method comprises configuring a group of associated wireless modems for mobility reporting. Each wireless modem is configured to report, to its serving radio access network node, at least one mobility related parameter as part of their mobility reporting. The wireless modems collectively are configured with different reporting trigger conditions for the same mobility related parameter.

22 Claims, 6 Drawing Sheets

(58) Field of Classification Search
CPC ......... H04W 4/08; H04W 4/80; H04W 24/02; H04W 76/14; H04W 76/28; H04W 84/22; H04W 72/121; H04W 68/00; H04W 48/181; H04W 8/18; H04W 8/24; H04W 48/14; H04W 8/183; H04W 8/205; H04W 12/45
See application file for complete search history.

(56) References Cited

U.S. PATENT DOCUMENTS 8,374,618 B2 * 2/2013 Pernu .................... H04W 74/08 455/550.1
8,521,096 B2 * 8/2013 Pernu .................... H04W 88/06 455/501
8,655,368 B2 * 2/2014 Dimou ............. H04W 36/0061 455/437
8,854,993 B2 * 10/2014 Pernu .................. H04L 41/0806 370/255
9,826,448 B2 * 11/2017 Le ...................... H04B 7/18506
9,888,420 B2 * 2/2018 Miranda ............. H04W 52/365
9,992,812 B2 * 6/2018 Watanabe ......... H04W 36/0058
10,349,462 B2 * 7/2019 Altman ................... H04L 43/20
10,420,161 B1 * 9/2019 Sava ................... H04W 72/542
10,667,166 B2 * 5/2020 Stein ..................... G06F 1/1637
11,191,119 B1 * 11/2021 Sava ................... H04W 72/542
11,218,955 B2 * 1/2022 Hedberg ................. H04W 8/24
11,412,426 B2 * 8/2022 Lotfallah ................ H04L 65/80
11,627,520 B2 * 4/2023 Hedberg ................. H04W 8/22 370/329
11,985,607 B2 * 5/2024 Chincholi ........... H04W 52/262
2005/0272431 A1 12/2005 Katori et al.
2011/0237259 A1 * 9/2011 Dimou ............. H04W 36/0061 455/437
2011/0312369 A1 12/2011 Furuya et al.
2015/0038141 A1 * 2/2015 Cheng ............... H04W 36/0088 455/436
2015/0131502 A1 * 5/2015 Narasimha ............ H04W 60/00 370/311
2015/0304911 A1 10/2015 Wang et al.
2015/0373772 A1 * 12/2015 Watanabe ............ H04W 76/19 455/436
2016/0014657 A1 * 1/2016 Le ................... H04W 36/00837 455/436
2016/0174241 A1 6/2016 Ansari et al.
2017/0034709 A1 2/2017 Hapsari et al.
2017/0251515 A1 * 8/2017 Altman ................. H04W 76/25
2018/0102830 A1 4/2018 Lange et al.
2018/0139585 A1 5/2018 Gholmieh et al.
2020/0236614 A1 * 7/2020 Hedberg ................. H04W 8/24
2021/0022036 A1 * 1/2021 Rönneke ........... H04W 28/0289
2021/0051540 A1 * 2/2021 Lotfallah ........ H04W 36/00226
2021/0219217 A1 * 7/2021 Hedberg ................. H04W 8/18

FOREIGN PATENT DOCUMENTS

WO 2017053286 A1 3/2017
WO 2017148511 A1 9/2017
WO 2019011434 A1 1/2019
WO 2019106575 A1 6/2019
WO 2019133049 A1 7/2019
WO 2020122796 A1 6/2020

OTHER PUBLICATIONS

CMCC, "Measurement coordination between LTE and NR", 3GPP TSG-RAN WG2 Meeting #99, R2-1709094, Revision of R2-1706997, Berlin, Germany, Aug. 21-25, 2017, 1-2.
Samsung, "Discussion on Adaptation of Measurement Related Parameters for Different Mobility Scenarios", 3GPP TSG RAN WG2 #99bis, R2-1711603, Resubmission of R2-1709601, Prague, Czech Republic, Oct. 9-13, 2017, 1-5.

* cited by examiner

CONFIGURING DIFFERENT MOBILITY REPORTING TRIGGER CONDITIONS FOR RELIABLE NETWORK CONNECTIVITY

TECHNICAL FIELD

Embodiments presented herein relate to a method, a controller, a computer program, and a computer program product for staggering connection establishment occasions for associated wireless modems. Embodiments presented herein further relate to a method, a communication device, a computer program, and a computer program product for staggered connection establishment occasions.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is network connectivity. In this respect, having a reliable network connection is paramount for some type of communication devices. In this respect, ultra-reliable low-latency communication (URLLC), is one of several different types of use cases supported by the fifth generation (5G) New Radio (NR) standard, as stipulated by 3GPP (3rd Generation Partnership Project) Release 15. URLLC will cater to multiple advanced services for latency-sensitive connected devices, such as factory automation, autonomous driving, the industrial internet and smart grid or robotic surgeries.

In order to support reliability requirements new technologies such as dedicated network slices, edge computing, multi-layer transmission, and communication devices with more than one wireless modem have been introduced, where the utilization of more than one wireless modem allows for increase connection reliability. Having more than one wireless modem in the communication device possibly improves reliability by adding a connection redundancy. However, increasing the number of wireless modems per se might not guarantee connectivity to be improved as all the wireless modems (even if having subscriptions to different mobile network operators) might in a real-life implementation request resources from the very same physical network and radio access network nodes. This has an impact in the network reliability, especially for connection establishment situations but also during other network events.

Hence, there is still a need for improved network reliability, especially with regards to connection establishment events.

SUMMARY

An object of embodiments herein is to increase efficient network reliability, especially with regards to connection establishment events.

According to a first aspect there is presented a method for staggering connection establishment occasions for associated wireless modems. The method is performed by a controller. The method comprises configuring a group of associated wireless modems for mobility reporting. Each wireless modem is configured to report, to its serving radio access network node, at least one mobility related parameter as part of their mobility reporting. The wireless modems collectively are configured with different reporting trigger conditions for the same mobility related parameter.

According to a second aspect there is presented a controller for staggering connection establishment occasions for associated wireless modems. The controller comprises processing circuitry. The processing circuitry is configured to cause the controller to configure a group of associated wireless modems for mobility reporting. Each wireless modem is configured to report, to its serving radio access network node, at least one mobility related parameter as part of their mobility reporting. The wireless modems collectively are configured with different reporting trigger conditions for the same mobility related parameter.

According to a third aspect there is presented a controller for staggering connection establishment occasions for associated wireless modems. The controller comprises a configure module configured to configure a group of associated wireless modems for mobility reporting. Each wireless modem is configured to report, to its serving radio access network node, at least one mobility related parameter as part of their mobility reporting. The wireless modems collectively are configured with different reporting trigger conditions for the same mobility related parameter.

According to a fourth aspect there is presented a computer program for staggering connection establishment occasions for associated wireless modems. The computer program comprises computer program code which, when run on processing circuitry of a controller, causes the controller to perform a method according to the first aspect.

According to a fifth aspect there is presented a method for staggered connection establishment occasions. The method is performed by a group of associated wireless modems. The method comprises obtaining configuring from a controller. Each wireless modem is configured to report, to its serving radio access network node, at least one mobility related parameter as part of their mobility reporting. The wireless modems collectively are configured with different reporting trigger conditions for the same mobility related parameter. The method comprises reporting, by each of the wireless modems, said at least one mobility related parameter as part of the mobility reporting.

According to a sixth aspect there is presented a communication device for staggered connection establishment occasions. The communication device comprises a group of associated wireless modems. The communication device further comprises processing circuitry. The processing circuitry is configured to cause the communication device to obtain configuring from a controller. Each wireless modem is configured to report, to its serving radio access network node, at least one mobility related parameter as part of their mobility reporting. The wireless modems collectively are configured with different reporting trigger conditions for the same mobility related parameter. The processing circuitry is configured to cause the communication device to report, by each of the wireless modems, said at least one mobility related parameter as part of the mobility reporting.

According to a seventh aspect there is presented a communication device for staggered connection establishment occasions the communication device comprises a group of associated wireless modems. The communication device further comprises an obtain module configured to obtain configuring from a controller. Each wireless modem is configured to report, to its serving radio access network node, at least one mobility related parameter as part of their mobility reporting. The wireless modems collectively are configured with different reporting trigger conditions for the same mobility related parameter. The communication device further comprises a report module configured to report, by each of the wireless modems, said at least one mobility related parameter as part of the mobility reporting.

According to an eighth aspect there is presented a computer program for staggered connection establishment occasions, the computer program comprising computer program code which, when run on processing circuitry of a communication device comprising a group of associated wireless modems, causes the communication device to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously these aspects enable improved network reliability compared to state of the art.

Advantageously these aspects enable connection establishment down time to be eliminated, or at least reduced compared to state of the art, by staggering the connection establishment occasions.

Advantageously these aspects enable connection establishment failure, or complications relating thereto, to have less end user impact.

Advantageously these aspects enable reduced signaling for connection establishment compared to state of the art as, for example, measurement reporting can be reduced if the wireless modems are known by the network to be clustered.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
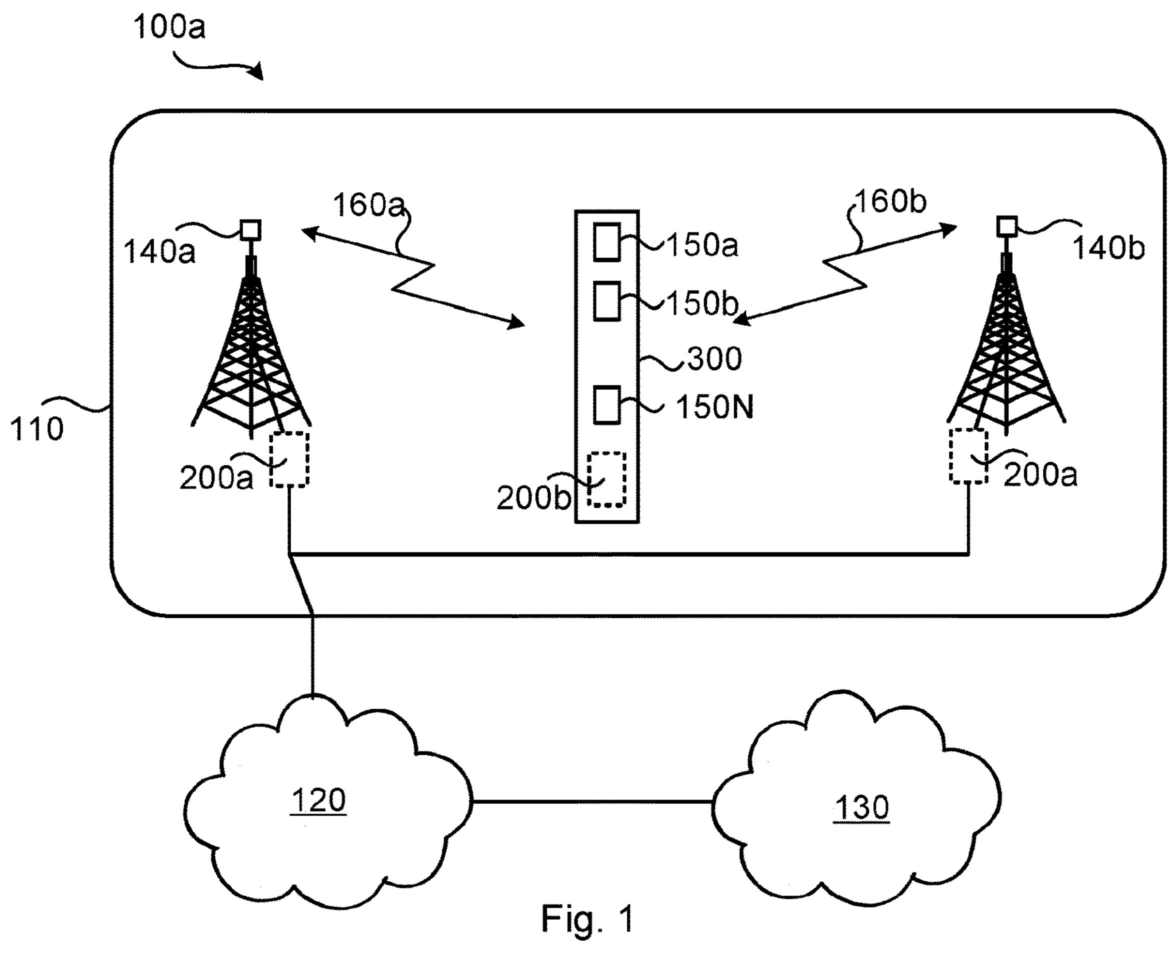
FIGS. 1, 7, 8 are schematic diagrams illustrating a communication network according to embodiments.

FIG. 1 is a schematic diagram illustrating a communication network 100*a* where embodiments presented herein can be applied. The communication network 100*a* could be a third generation (3G) telecommunications network, a fourth generation (4G) telecommunications network, or a fifth (5G) telecommunications network and support any 3GPP telecommunications standard, where applicable.

The communication network 100 comprises radio access network nodes 140*a*, 140*b* configured to, in a radio access network 110, provide network access to a group of associated wireless modems 150*a*, 150*b*, . . . , 150N. Examples of radio access network nodes 140*a*, 140*b* are radio base stations, base transceiver stations, Node Bs, eNBs, gNBs, access points, and access nodes, and backhaul nodes. The wireless modems 150*a*:150N are schematically shown as being part of a communication device 300. In some embodiments the group of associated wireless modems 150*a*:150N are thus part of, integrated with, or collocated with, a communication device 300. In some aspects the communication device 300 is a vehicle.

The radio access network 110 is operatively connected to a core network 120. The core network 120 is in turn operatively connected to a service network 130, such as the Internet. The wireless modems 150*a*:150N are thereby enabled to, via the radio access network nodes 140*a*, 140*b*, access services of, and exchange data with, the service network 130.

The communication network 100 further comprises at least one controller 200*a*, 200*b*. In some embodiments, the controller 200*a* is part of, integrated with, or collocated with, at least one radio access network node 140. This will hereinafter be referred to as network side configuration. In other embodiments, the controller 200*b* is collocated with the wireless modems 150*a*:150N. This will hereinafter be referred to as communication device side configuration. Further aspects of the controller 200*a*, 200*b* will be disclosed below.

Figure 2:
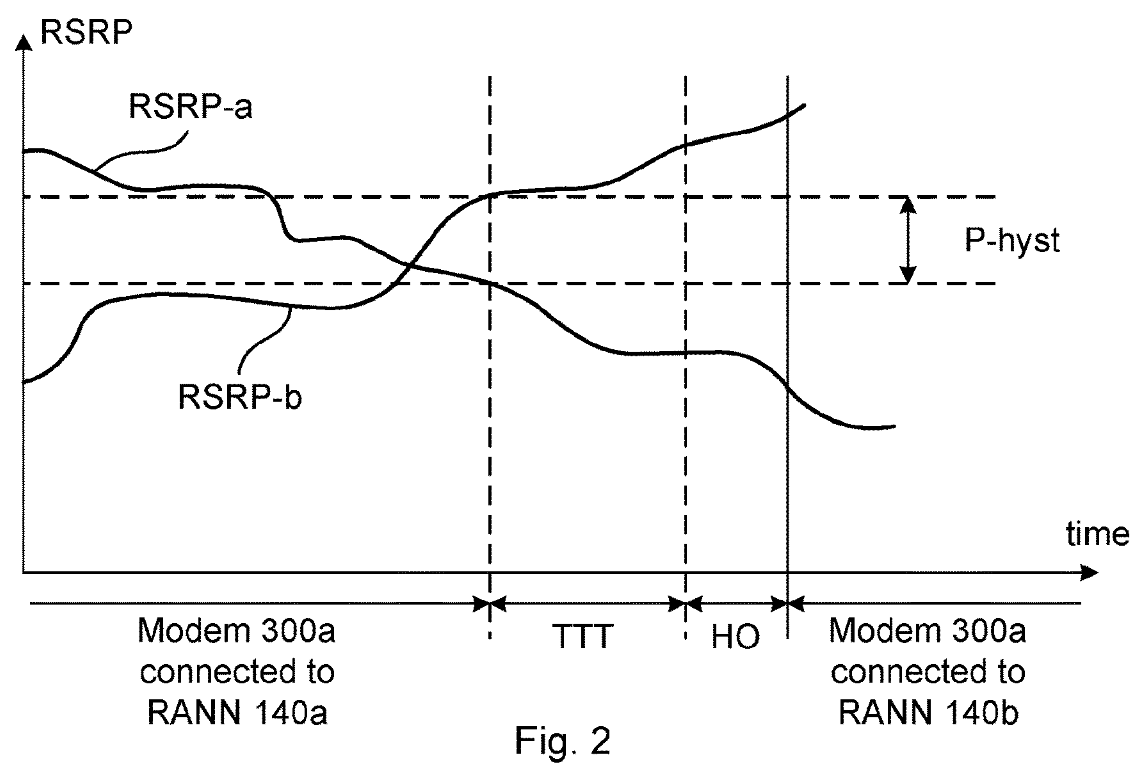
FIG. 2 is a schematic illustration of measurements of power as a function of time according to embodiments.

The radio access network nodes 140*a*, 140*b* are configured to provide network access to the wireless modems 150*a*:150N over radio links 160*a*, 160*b*. Which of the radio access network nodes 140*a*, 140*b* to provide network access to the wireless modems 150*a*:150N depends on measurement, such as reference signal received power (RSRP), as performed by the wireless modems 150*a*:150N on signals, such as reference signals, as transmitted from the radio access network nodes 140*a*, 140*b*. Further in this respect, FIG. 2 schematically illustrates the RSRP of wireless modem 150*a* as measured on signals from radio access network node (RANN) 140*a* and radio access network node

140*b*, respectively, as wireless modem 150*a* is moved from being closest to radio access network node 140*a* to being closest to radio access network node 140*b*. The RSRP as measured on signals from radio access network node 140*a* is shown as RSRP-a and the RSRP as measured on signals from radio access network node 140*b* is shown as RSRP-b. Initially, RSRP-a>RSRP-b and wireless modem 150*a* is operatively connected to, and thus served by, radio access network node 140*a*. The criterion for wireless modem 150*a* to be handed over to radio access network node 140*b* is assumed to be that RSRP-b needs to be more than a power margin (defined by P-hyst, as in hysteresis) larger than RSRP-a during a Time-to-Trigger (TTT) period. When RSRP-b+P-hyst>RSRP-a at least during the time period TTT, wireless modem 150*a* is handed over to radio access network node 140*b*. The time period required for performing the actual handover is denoted "HO" (as in handover) in FIG. 2. During this time period the bitrate at which the wireless modem 150*a* is served is reduced. After the handover, wireless modem 150*a* is operatively connected to, and thus served by, radio access network node 140*b*.

Figure 3:
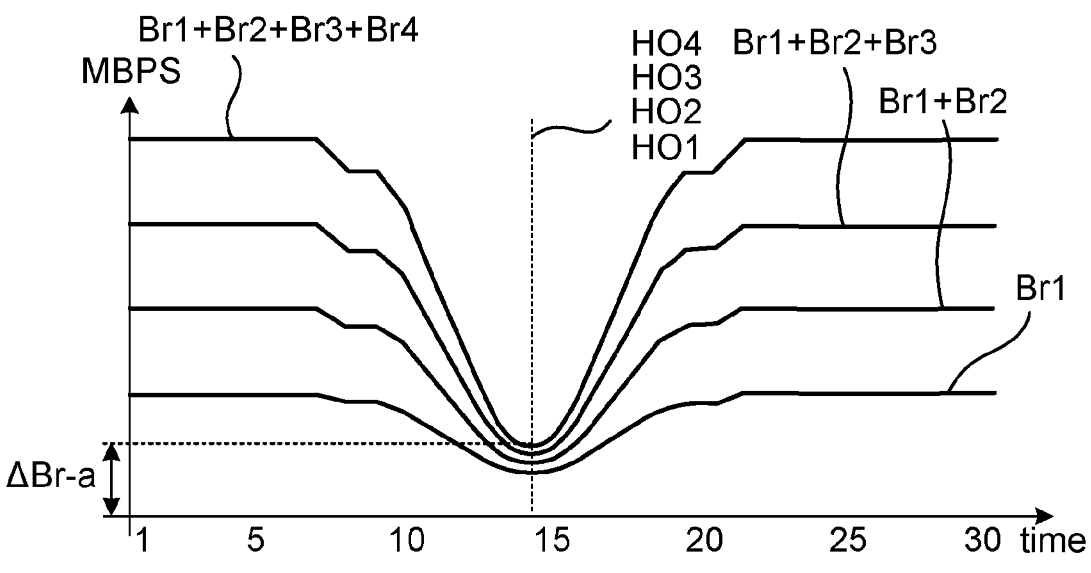
FIGS. 3 and 6 are schematic illustrations of bitrate as a function of time according to embodiments.

As disclosed above, there is a need for improved network reliability, especially with regards to handovers or other types of connection establishment events. In this respect, FIG. 3 schematically illustrates the bitrate (denoted Br1, Br2, Br3, Br4) for a group of four associated wireless modems as these wireless modems are moved from being closest to radio access network node 140*a* to being closest to radio access network node 140*b* (and thus being handed over from radio access network node 140*a* to radio access network node 140*b*). Brx denotes the bitrate for wireless modem x, where 1≤x≤4. In case all these wireless modems have the same configuration for performing handover, all handovers will thus occur at the same point in time, as indicated by HO1, HO2, HO3, and HO4 all occurring at the same point in time, where HOx denotes handover for wireless modem x. Hence, there is a risk that the total bitrate Br1+Br2+Br3+Br4 would be significantly reduced at this point in time due to the aforementioned time period HO required for performing the actual handover. Thus, providing the communication device 300 with multiple wireless modems 150*a*:150N might as such not improve the reliability of the network connection. Whilst FIG. 3 has illustrated a scenario where the connection establishment pertains to handovers, corresponding results are valid also for other examples of connection establishment.

The embodiments disclosed herein therefore relate to mechanisms for staggering connection establishment occasions for associated wireless modems 150*a*:150N and staggered connection establishment occasions. In order to obtain such mechanisms there is provided a controller 200*a*, 200*b*, a method performed by the controller 200*a*, 200*b*, a computer program product comprising code, for example in the form of a computer program, that when run on processing circuitry of the controller 200*a*, 200*b*, causes the controller 200*a*, 200*b* to perform the method. In order to obtain such mechanisms there is further provided a communication device 300, a method performed by the communication device 300, and a computer program product comprising code, for example in the form of a computer program, that when run on processing circuitry of the communication device 300, causes the communication device 300 to perform the method.

Figure 4:
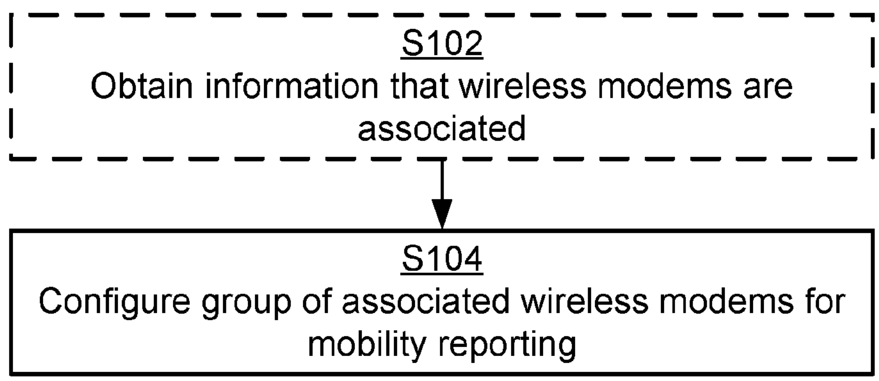
FIGS. 4 and 5 are flowcharts of methods according to embodiments.

Reference is now made to FIG. 4 illustrating a method for staggering connection establishment occasions for associated wireless modems 150*a*:150N as performed by the controller 200*a*, 200*b* according to an embodiment.

The herein disclosed embodiments are based on that a group of associated wireless modems 150*a*:150N are provisioned, or configured, such that their connection establishment occurrences are distributed over time. This is enabled by configuring the wireless modems 150*a*:150N with different reporting trigger conditions for the same mobility related parameter. Mobility measurement reports from the wireless modems 150*a*:150N are sent at different time instances since the reporting trigger conditions are satisfied at different time instances, resulting in distributed connection establishment times. In particular, the controller 200*a*, 200*b* is configured to perform step S104:

S104: The controller 200*a*, 200*b* configures the group of associated wireless modems 150*a*:150N for mobility reporting. Each wireless modem 150*a*:150N is configured to report, to its serving radio access network node 140, at least one mobility related parameter as part of their mobility reporting. The wireless modems 150*a*:150N collectively are configured with different reporting trigger conditions for the same mobility related parameter.

This method enables the connection establishment occurrences of multiple wireless modems 150*a*:150N having different configurations for mobility reporting and belonging to the same communication device 300, such as a network connected vehicle, to be distributed over time. Further effects will be disclosed below with reference to FIG. 6.

Embodiments relating to further details of staggering connection establishment occasions for associated wireless modems 150*a*:150N as performed by the controller 200*a*, 200*b* will now be disclosed.

The connection establishment occasions for the associated wireless modems 150*a*:150N are thereby staggered. Examples of connection establishment events are cell selection, cell reselection, connection reconfiguration, and handover. Hence, the above disclosed method enables staggering any of: cell selection occasions, cell reselection occasions, connection reconfiguration occasions, handover occasions.

There could be different ways for the controller 200*a*, 200*b* to configure the group of associated wireless modems 150*a*:150N as in S104. In some examples, the group of associated wireless modems 150*a*:150N are configured for mobility reporting via one of: radio resource control (RRC) signalling, medium access control (MAC) signalling, radio link control (RLC) signalling, or physical (PHY) layer signalling.

There could be different examples of mobility related parameters. In some examples, the mobility related parameter is at least one of: reference signal received power (RSRP) and reference signal received quality (RSRQ).

There could be different examples of reporting trigger conditions. In some examples the reporting trigger conditions pertain to at least one of: signal strength threshold, hysteresis offset, TTT value, and a measurement report offset. The wireless modems 150*a*:150N could thereby collectively be configured with different strength thresholds, hysteresis offsets, TTT values, and/or measurement report offsets. In this way the connection establishment criteria can be evaluated at different time instances for the different wireless modems 150*a*:150N. When the communication device 300 comprising the group of associated wireless modems 150*a*:150N is close to cell edge, these wireless modems 150*a*:150N might then, for example, report mobility related parameter as part of the mobility reporting at different time instances and hence be handed over at different time instances.

There could be different alternatives for where the controller 200*a*, 200*b* might be provided. As disclosed above with reference to FIG. 1, the controller 200*a*, 200*b* might either be operatively connected to the wireless modems 150*a*:150N or be part of the radio access network nodes 140*a*, 140*b*. The wireless modems 150*a*:150*b* can thereby be configured from either the network side or the communication device side.

When the controller 200*a*, 200*b* is part of the communication device 300, such a communication device 300 might update the configuration of the wireless modems 150*a*:150N autonomously, without involvement of the network, to impact the connection establishments to be distributed over time.

In some aspects, the controller 200*a*, 200*b* receives information that the wireless modems 150*a*:150N are affiliated, and thus associated with each other. That is, according to an embodiment, the controller 200*a*, 200*b* is configured to perform (optional) step S102:

S102: The controller 200*a*, 200*b* obtains information that the wireless modems 150*a*:150N are associated with each other.

There could be different ways for the controller 200*a*, 200*b* to obtain this information. In some examples, the information is obtained from a database or from at least one of the wireless modems 150*a*:150N.

In some aspects, not all of the wireless modems 150*a*:150N need to be handed over to one and the same target radio access network node 140*b*. Hence, in some examples the wireless modems 150*a*:150N are handed over to radio access network nodes of two or more different mobile network operators in a staggered fashion.

Figure 5:
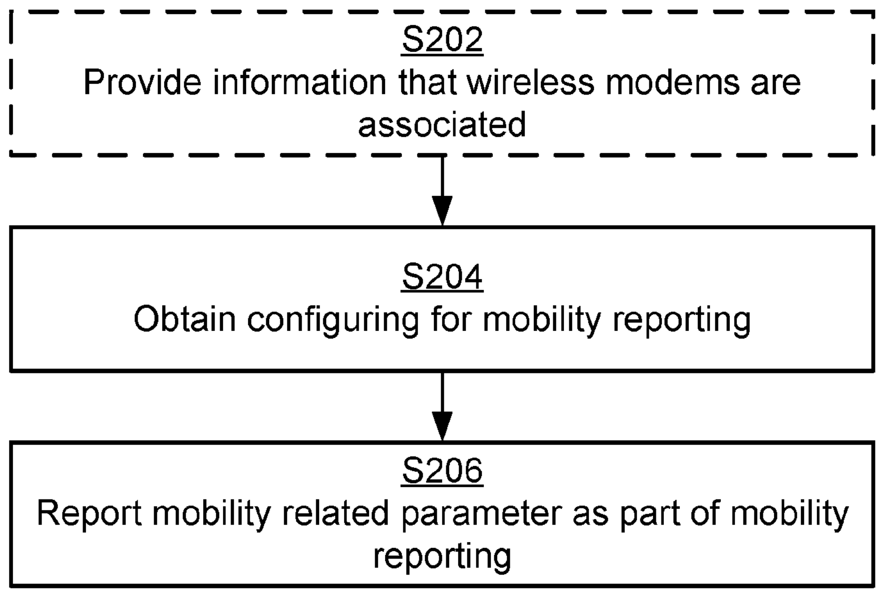

Reference is now made to FIG. 5 illustrating a method for staggered connection establishment occasions as performed by the communication device 300 according to an embodiment. The communication device 300 comprises the group of associated wireless modems 150*a*:150N.

It is assumed that the controller 200*a*, 200*b* configures the group of associated wireless modems 150*a*:150N for mobility reporting as in S104. Hence, the communication device 300 is, by means of the group of associated wireless modems 150*a*:150N configured to perform step S204:

S204: The group of associated wireless modems 150*a*:150N obtains configuring from a controller 200*a*, 200*b*. Each wireless modem 150*a*:150N is configured to report, to its serving radio access network node 140, at least one mobility related parameter as part of their mobility reporting. The wireless modems 150*a*:150N collectively are configured with different reporting trigger conditions for the same mobility related parameter.

The connection establishment occasions for the associated wireless modems 150*a*:150N are thereby staggered according to the different reporting trigger conditions for the same mobility related parameter.

The group of associated wireless modems 150*a*:150N then report the mobility related parameter according to the configuring in step S204. That is, the communication device 300 is, by means of the group of associated wireless modems 150*a*:150N configured to perform step S206:

S206: Each of the wireless modems 150*a*:150N reports the at least one mobility related parameter as part of the mobility reporting in accordance with the configuring in S204.

Embodiments relating to further details of staggered connection establishment occasions as performed by the communication device 300 will now be disclosed.

As disclosed above, examples of connection establishment events are cell selection, cell reselection, connection reconfiguration, and handover. Hence, the above disclosed method enables staggering any of: cell selection occasions, cell reselection occasions, connection reconfiguration occasions, handover occasions.

In some aspects, the group of associated wireless modems 150*a*:150N are configured to report the mobility related parameter according to the configuring in step S204 via an operating system module 170 in the communication device 300.

In some aspects, utilizing the fact that in some embodiments the radio access network node 140 is aware of that the wireless modems 150*a*:150N are associated with each other, it might be sufficient that one single one of the wireless modems 150*a*:150N handle measurement reporting whilst the remaining ones just can be regarded as slaves.

Examples of different ways for the controller 200*a*, 200*b* to configure the group of associated wireless modems 150*a*:150N have been disclosed above. Hence, in some examples, the group of associated wireless modems 150*a*:150N are configured for mobility reporting via one of: RRC signalling, MAC/RLC signalling, or physical layer signalling.

Examples of different reporting trigger conditions have been disclosed above. Hence, in some examples, the reporting trigger conditions pertain to at least one of: signal strength threshold, hysteresis offset, TTT value, and a measurement report offset. The wireless modems 150*a*:150N could thereby collectively be configured with different strength thresholds, hysteresis offsets, TTT values, and/or measurement report offsets.

Examples of mobility related parameters have been disclosed above. Hence, in some examples, the mobility related parameter is at least one of: RSRP and RSRQ.

There could be different points in time when the wireless modems 150*a*:150N are associated with each other. In some examples the wireless modems 150*a*:150N are associated with each other at network attach time. In other examples the wireless modems 150*a*:150N are associated with each other by default, for example by being hardcoded to be associated with each other.

In some aspects at least one of the wireless modems 150*a*:150N is configured to provide information to the controller 200*a*, 200*b* that the wireless modems 150*a*:150N are affiliated, and thus associated with each other. That is, in some embodiments the communication device 300 is, by means of at least one of the wireless modems 150*a*:150N configured to perform (optional) step S202:

S202: Information that the wireless modems 150*a*:150N are associated with each other is provided from at least one of the wireless modems 150*a*:150N, or the communication device 300.

The information could be provided to a database or to the controller 200*a*, 200*b*.

There could be different points in time when the information is provided. In some examples the information is provided at time of network registration of the wireless modems 150*a*:150N but before data bearer connection establishment to the wireless modems 150*a*:150N.

Figure 6:
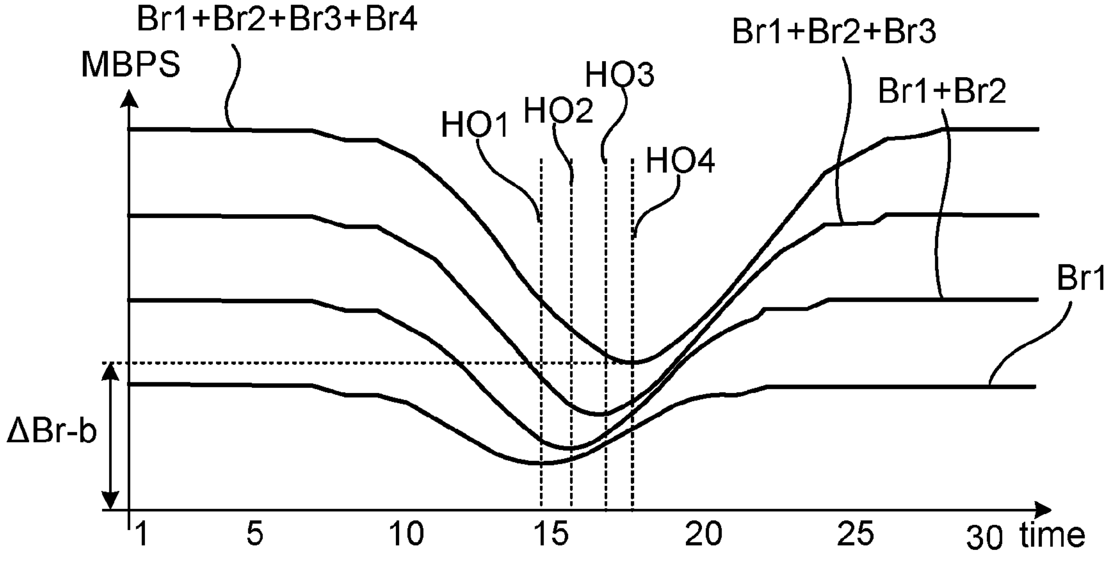

FIG. 6 is similar to above referenced FIG. 3 and schematically illustrates the bitrate (denoted Br1, Br2, Br3, Br4) for the same group of four associated wireless modems as in FIG. 3 as these wireless modems are moved from being closest to radio access network node 140*a* to being closest to radio access network node 140*b* (and thus being handed over from radio access network node 140*a* to radio access network node 140*b*), with the difference that for the results shown in FIG. 6, the wireless modems have been configured such that the handover occasions for the associated wireless modems are staggered according to the different reporting trigger conditions for the same mobility related parameter. In FIG. 6 this is illustrated by the handover occasions not occurring at the same point in time, but instead being staggered, as indicated by HO1, HO2, HO3, and HO4. Hence, handover for wireless modem x occurs after the handover for wireless modem x−1. Hence, the total bitrate Br1+Br2+Br3+Br4 will not be as reduced as in FIG. 3 when the handovers are performed, i.e., ΔBr-b>ΔBr-a. That is, offsetting the handover timing provides less sharp dip in connection speed for the group of associated wireless modems. Whilst FIG. 6 has illustrated a scenario where the connection establishment pertains to handovers, corresponding results are valid also for other examples of connection establishment.

Figure 7:
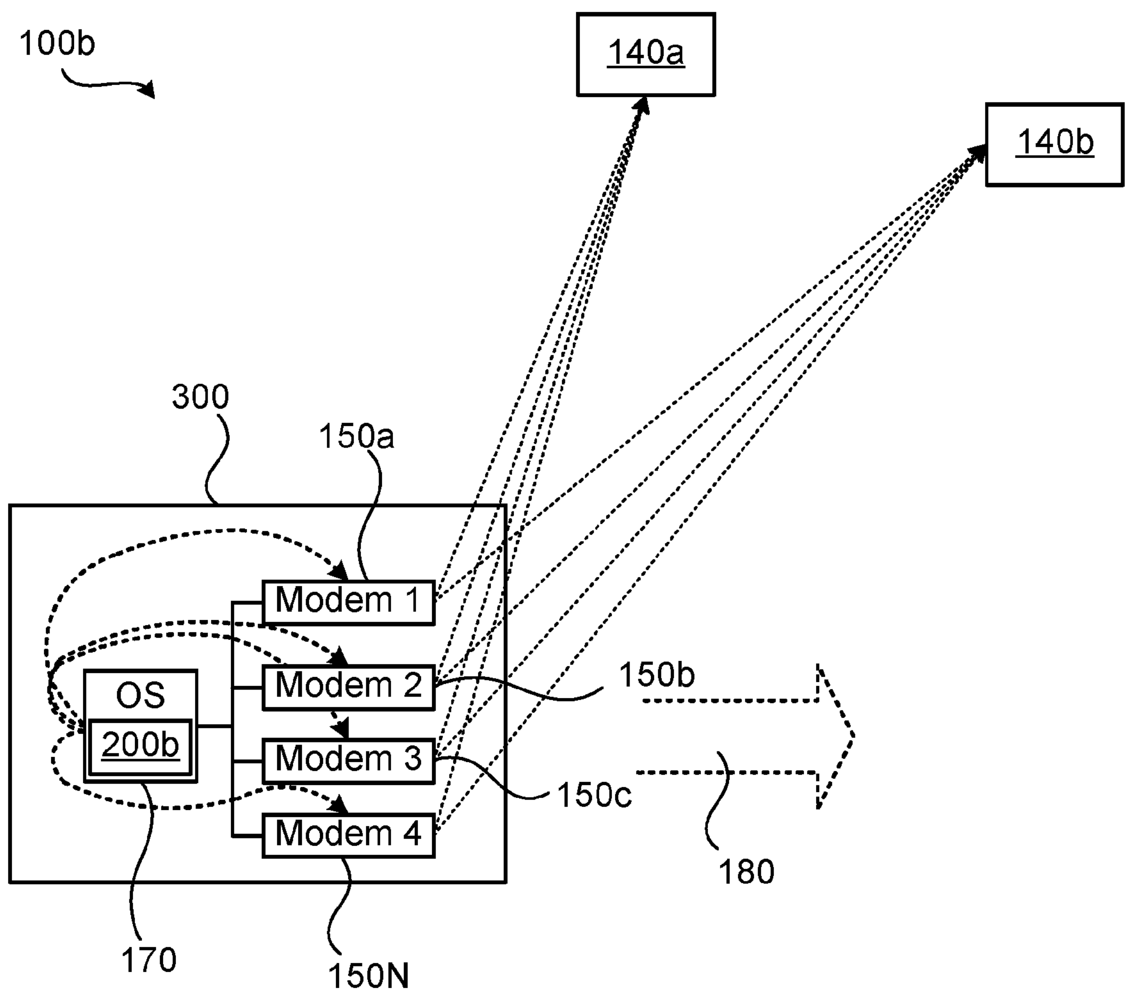
Figure 8:
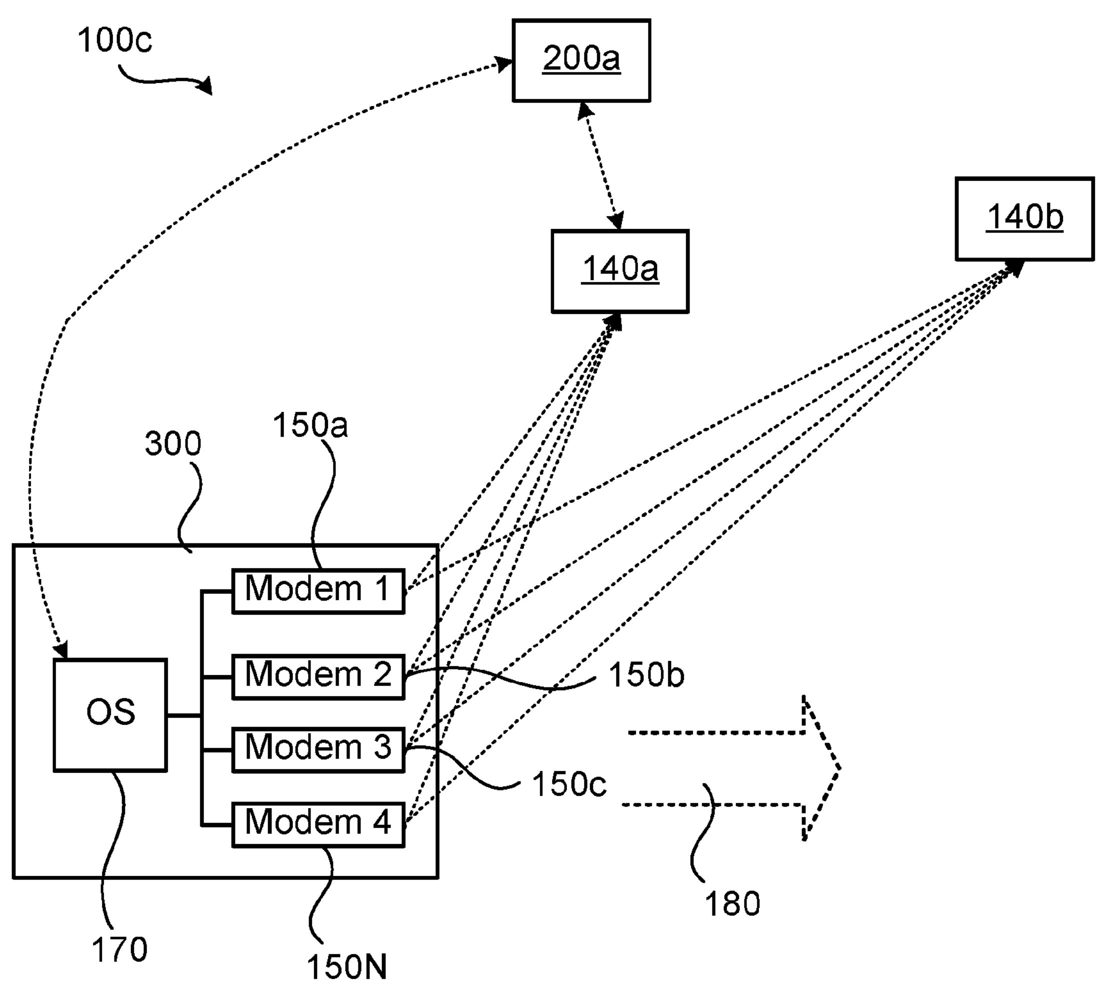

FIG. 7 and FIG. 8 are similar to FIG. 1 and schematically illustrates communication networks 100*b*, 100*c* where the communication device 300 moves, in direction according to arrow 180, from being closest to radio access network node 140*a* to being closest to radio access network node 140*b* (and thus being handed over from radio access network node 140*a* to radio access network node 140*b*). Whilst FIG. 7 and FIG. 8 illustrate scenarios where the connection establishment pertains to handovers, corresponding results are valid also for other examples of connection establishment.

The communication device 300 comprises four wireless modems 150*a*, 150*b*, 150*c*, 150N operatively connected to an operating system (OS) module 170 in the communication device 300. The OS module 170 might implement communication at protocol layer 3 (for radio resource control (RRC) signalling) and upwards in the protocol stack whereas the wireless modems 150*a*:150N might implement communication at protocol layer 1 (for physical (PHY) layer signalling) and protocol layer 2 (for medium access control (MAC) and radio link control (RLC) signalling). The wireless modems 150*a*:150N have been configured such that the connection establishment occasions for the associated wireless modems are staggered according to the different reporting trigger conditions for the same mobility related parameter. Such configuring might be provided to the wireless modems 150*a*:150N from the controller 200*a*, 200*b* via the OS module 170.

That is, when the communication device 300 moves along the direction of arrow 180 and becomes closer to radio access network node 140*b*, the wireless modems 150*a*, 150*b*, 150*c*, 150N will report at least one mobility related parameter as part of the mobility reporting in accordance with the configuring in S204. The connection establishment occasions for the associated wireless modems 150*a*, 150*b*, 150*c*, 150N are thereby staggered according to the different reporting trigger conditions for the same mobility related parameter, as illustrated in previously referenced FIG. 6. In the example of FIG. 7, the herein disclosed controller 200*b*, or at least its functionality, is implemented in the OS module 170. In the example of FIG. 8, the herein disclosed controller 200*a*, or at least its functionality, is implemented in the network.

Figure 9:
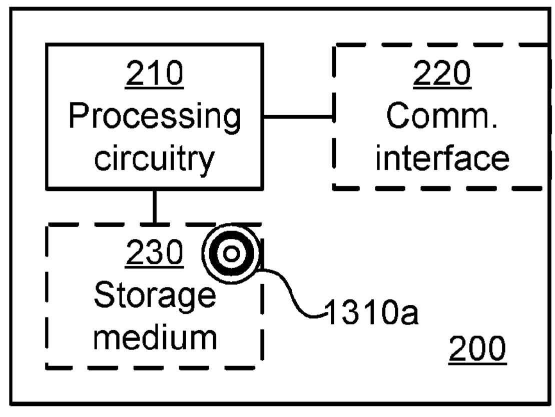
FIG. 9 is a schematic diagram showing functional units of a controller according to an embodiment.

FIG. 9 schematically illustrates, in terms of a number of functional units, the components of a controller 200*a*, 200*b* according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310*a* (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the controller 200*a*, 200*b* to perform a set of operations, or steps, as disclosed above. For example, the storage medium 230 may store the set of operations, and the processing circuitry 210 may be configured to retrieve the set of operations from the storage medium 230 to cause the controller 200*a*, 200*b* to perform the set of operations. The set of operations may be provided as a set of executable instructions. Thus, the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The controller 200*a*, 200*b* may further comprise a communications interface 220 for communications with other entities, functions, nodes, and devices in, or served by, the communication networks 100*a*, 100*b*, 100*c* of FIG. 1, FIG. 7, and FIG. 8. As such the communications interface 220 may comprise one or more transmitters and receivers, comprising analogue and digital components.

The processing circuitry 210 controls the general operation of the controller 200*a*, 200*b* e.g. by sending data and control signals to the communications interface 220 and the storage medium 230, by receiving data and reports from the communications interface 220, and by retrieving data and instructions from the storage medium 230. Other components, as well as the related functionality, of the controller 200*a*, 200*b* are omitted in order not to obscure the concepts presented herein.

Figure 10:
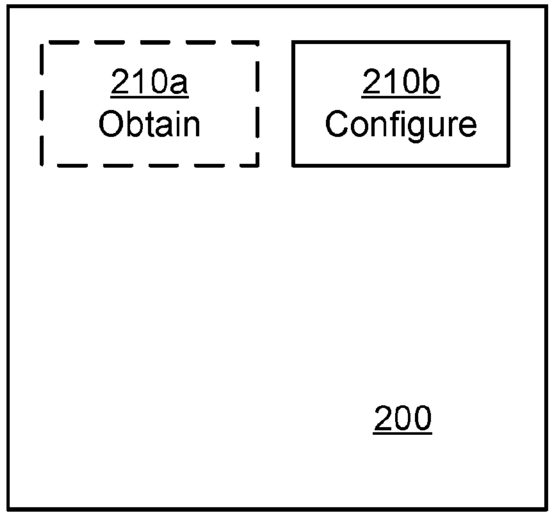
FIG. 10 is a schematic diagram showing functional modules of a controller according to an embodiment.

FIG. 10 schematically illustrates, in terms of a number of functional modules, the components of a controller 200*a*, 200*b* according to an embodiment. The controller 200*a*, 200*b* of FIG. 10 comprises a configure module 210*b* configured to perform step S104. The controller 200*a*, 200*b* of FIG. 10 may further comprise a number of optional functional modules, such as an obtain module 210*a* configured to perform step S102. In general terms, each functional module 210*a*-210*b* may be implemented in hardware or in software. Preferably, one or more or all functional modules 210*a*-210*b* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*-210*b* and to execute these instructions, thereby performing any steps of the controller 200*a*, 200*b* as disclosed herein.

Figure 11:
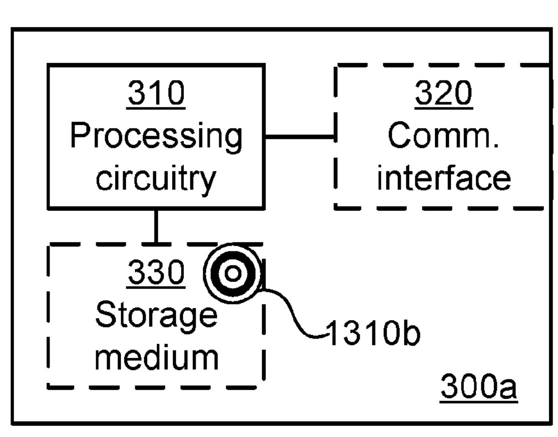
FIG. 11 is a schematic diagram showing functional units of a communication device according to an embodiment.

FIG. 11 schematically illustrates, in terms of a number of functional units, the components of a communication device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1310*b* (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the communication device 300 to perform a set of operations, or steps, as disclosed above. For example, the storage medium 330 may store the set of operations, and the processing circuitry 310 may be configured to retrieve the set of operations from the storage medium 330 to cause the communication device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The communication device 300 may further comprise a communications interface 320 for communications with other entities, functions, nodes, and devices in, or served by, the communication networks 100*a*, 100*b*, 100*c* of FIG. 1, FIG. 7, and FIG. 8. As such the communications interface 320 may comprise one or more transmitters and receivers, comprising analogue and digital components. In some aspects the communications interface 320 comprises the group of associated wireless modems 150*a*:150N The processing circuitry 310 controls the general operation of the communication device 300 e.g. by sending data and control signals to the communications interface 320 and the storage medium 330, by receiving data and reports from the communications interface 320, and by retrieving data and instructions from the storage medium 330. Other components, as well as the related functionality, of the communication device 300 are omitted in order not to obscure the concepts presented herein.

Figure 12:
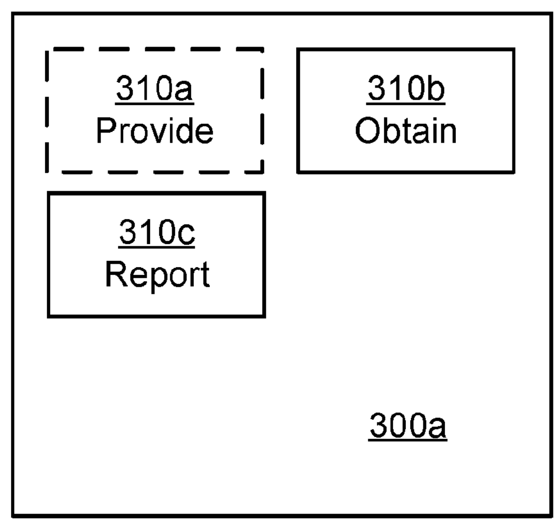
FIG. 12 is a schematic diagram showing functional modules of a communication device according to an embodiment.

FIG. 12 schematically illustrates, in terms of a number of functional modules, the components of a communication device 300 according to an embodiment. The communication device 300 of FIG. 12 comprises a number of functional modules; an obtain module 310*b* configured to perform step S204, and a report module 310*c* configured to perform step S206. The communication device 300 of FIG. 12 may further comprise a number of optional functional modules, such as a provide module 310*a* configured to perform step S202. In general terms, each functional module 310*a*-310*c* may be implemented in hardware or in software. Preferably, one or more or all functional modules 310*a*-310*c* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*-310*c* and to execute these instructions, thereby performing any steps of the communication device 300 as disclosed herein.

Figure 13:
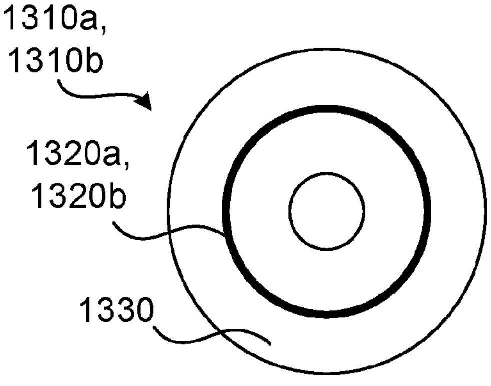
FIG. 13 shows one example of a computer program product comprising computer readable means according to an embodiment.

FIG. 13 shows one example of a computer program product 1310*a*, 1310*b* comprising computer readable means 1330. On this computer readable means 1330, a computer program 1320*a* can be stored, which computer program 1320*a* can cause the processing circuitry 210 and thereto operatively coupled entities and devices, such as the communications interface 220 and the storage medium 230, to execute methods according to embodiments described herein. The computer program 1320*a* and/or computer program product 1310*a* may thus provide means for performing any steps of the controller 200*a*, 200*b* as herein disclosed. On this computer readable means 1330, a computer program 1320*b* can be stored, which computer program 1320*b* can cause the processing circuitry 310 and thereto operatively coupled entities and devices, such as the communications interface 320 and the storage medium 330, to execute methods according to embodiments described herein. The computer program 1320*b* and/or computer program product 1310*b* may thus provide means for performing any steps of the communication device 300 as herein disclosed.

In the example of FIG. 13, the computer program product 1310*a*, 1310*b* is illustrated as an optical disc, such as a CD (compact disc) or a DVD (digital versatile disc) or a Blu-Ray disc. The computer program product 1310*a*, 1310*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320*a*, 1320*b* is here schematically shown as a track on the depicted optical disk, the computer program 1320*a*, 1320*b* can be stored in any way which is suitable for the computer program product 1310*a*, 1310*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method performed with respect to a plurality of individual wireless modems in a mobile communications device connectable to a communications network for redundant connectivity between the mobile communications device and the communications network, the method being performed by a controller and comprising:

configuring the individual wireless modems with different reporting trigger conditions for a same mobility related parameter, so that mobility reporting for the individual wireless modems to the communications network is triggered at different times, thus staggering respective connection establishment occasions for the individual wireless modems with respect to the communications network.

2. The method according to claim 1, wherein the different reporting trigger conditions pertain to at least one of: signal strength threshold, hysteresis offset, time-to-trigger (TTT) value, and a measurement report offset.

3. The method according to claim 2, wherein the different reporting trigger conditions comprise any one or more of: different strength thresholds, different hysteresis offsets, different time-to-trigger (TTT) values, and/or different measurement report offsets.

4. The method according to claim 1, wherein the same mobility related parameter is at least one of: reference signal received power (RSRP) and reference signal received quality (RSRQ).

5. The method according to claim 1, further comprising:

obtaining information indicating that the individual wireless modems belong to the same mobile communications devicer.

6. The method according to claim 5, wherein the information is obtained from a database or from at least one of the individual wireless modems.

7. The method according to claim 1, wherein the individual wireless modems are configured for mobility reporting via one of: RRC signalling, MAC/RLC signalling, or Physical layer signalling.

8. The method according to claim 1, wherein the controller is comprised in the mobile communications device.

9. The method according to claim 1, wherein the controller is part of, integrated with, or collocated with, a radio access network node of the communications network.

10. A method performed by a mobile communications device comprising a plurality of individual modems connectable to a communications network for redundant connectivity between the mobile communications device and the communications network, the method comprising:

obtaining different reporting trigger conditions for a same mobility related parameter for the individual modems; and performing mobility reporting for the individual wireless modems at different times according to the different reporting trigger conditions, thus staggering respective connection establishment occasions for the individual wireless modems with respect to the communications network.

11. The method according to claim 10, wherein the different reporting trigger conditions pertain to at least one of: signal strength threshold, hysteresis offset, time-to-trigger (TTT) value, and a measurement report offset.

12. The method according to claim 11, wherein the different reporting trigger conditions comprise one or more of: different strength thresholds, different hysteresis offsets, different TTT values, and/or different measurement report offsets.

13. The method according to claim 10, wherein the same mobility related parameter is at least one of: reference signal received power (RSRP) and reference signal received quality (RSRQ).

14. The method according to claim 10, wherein the individual wireless modems are determined to belong to the same mobile communications device in association with the mobile communications device attaching to the communications network.

15. The method according to claim 10, further comprising:

the mobile communications device providing information that the individual wireless modems are associated with each other.

16. The method according to claim 15, wherein the information is provided to a database or to a controller that determines the different reporting trigger conditions.

17. The method according to claim 15, wherein the information is provided at time of network registration of the individual wireless modems but before data bearer connection establishment to the individual wireless modems.

18. The method according to claim 10, wherein the different reporting trigger conditions are obtained via one of: RRC signalling, MAC/RLC signalling, or Physical layer signalling.

19. The method according to claim 10, wherein a controller comprised in the mobile communications device obtains the different reporting trigger conditions for configuring the individual wireless modems.

20. The method according to claim 10, wherein a controller comprised in a radio network node of the communications network obtains the different reporting trigger conditions for transmission to the mobile communications device.

21. A controller comprised in a radio network node of a communications network, or comprised in a mobile communications device, the controller comprising processing circuitry configured to:

obtain different reporting trigger conditions for a same mobility related parameter, for individual modems in a plurality of individual modems included in the mobile communications device for redundant connectivity between the mobile communications device and the communications network; and configure the individual wireless modems with the different reporting trigger conditions, so that mobility reporting for the individual wireless modems to communications network is triggered at different times, thus staggering respective connection establishment occasions for the individual modems with respect to the communications network.

22. A mobile communications device comprising:

a plurality of individual wireless modems connectable to a communications network for redundant connectivity between the mobile communications device and the communications network; and processing circuitry configured to obtain different reporting trigger conditions for the individual wireless modems for a same mobility related parameter; and wherein the mobile communications device performs mobility reporting at different times for the individual wireless modems according to the different reporting trigger conditions, thus staggering respective connection establishment occasions by the individual wireless modems with respect to the communications network.

* * * * *